US007069197B1

(12) United States Patent
Saidane

(10) Patent No.: US 7,069,197 B1
(45) Date of Patent: Jun. 27, 2006

(54) FACTOR ANALYSIS/RETAIL DATA MINING SEGMENTATION IN A DATA MINING SYSTEM

(75) Inventor: Hassine Saidane, San Diego, CA (US)

(73) Assignee: NCR Corp., Dayton, OH (US)

( * ) Notice: Subject to any disclaimer, the term of this patent is extended or adjusted under 35 U.S.C. 154(b) by 833 days.

(21) Appl. No.: 09/999,522

(22) Filed: Oct. 25, 2001

(51) Int. Cl.
*G06F 17/10* (2006.01)
*G06F 17/60* (2006.01)

(52) U.S. Cl. .................. 703/2; 703/6; 703/13; 703/21; 707/1; 707/3; 707/6; 707/100; 707/200; 700/19

(58) Field of Classification Search .................... 703/2, 703/22, 6, 21; 705/10; 706/46; 707/6, 100, 707/200, 1, 3; 700/19
See application file for complete search history.

(56) References Cited

U.S. PATENT DOCUMENTS 5,884,305 A * 3/1999 Kleinberg et al. ............ 707/6
6,032,146 A * 2/2000 Chadha et al. ................ 707/6
6,421,665 B1 * 7/2002 Brye et al. ..................... 707/3
6,581,058 B1 * 6/2003 Fayyad et al. ................ 707/6
6,629,095 B1 * 9/2003 Wagstaff et al. .............. 707/5
6,687,693 B1 * 2/2004 Cereghini et al. ............ 707/6
6,728,728 B1 * 4/2004 Spiegler et al. ......... 707/103 R
6,735,589 B1 * 5/2004 Bradley et al. ............... 707/6
6,836,773 B1 * 12/2004 Tamayo et al. ............... 707/6
6,865,573 B1 * 3/2005 Hornick et al. ............... 707/6
6,947,878 B1 * 9/2005 Bisgaard-B hr et al. ........ 703/2
2002/0059003 A1 * 5/2002 Ruth et al. .................... 700/19
2002/0083067 A1 * 6/2002 Tamayo et al. ............ 707/100
2002/0087567 A1 * 7/2002 Spiegler et al. ............ 707/100
2002/0087967 A1 * 7/2002 Conkwright et al. .......... 725/1
2002/0129038 A1 * 9/2002 Cunningham ............... 707/200
2002/0169735 A1 * 11/2002 Kil et al. ...................... 706/46
2002/0174087 A1 * 11/2002 Hao et al. ...................... 707/1
2003/0055707 A1 * 3/2003 Busche et al. ................ 705/10
2004/0010497 A1 * 1/2004 Bradley et al. ............ 707/100

OTHER PUBLICATIONS

"Quantifiable data mining using ratio rules", F. Korn et al, The VLDB Journal 2000, pp. 254-266, Feb. 2000.*

(Continued)

*Primary Examiner*—Fred Ferris
(74) *Attorney, Agent, or Firm*—Gates and Cooper

(57) ABSTRACT

A computer-implemented data mining system that analyzes customer transaction data using Factor Analysis/Retail Data Mining Segmentation. The data is accessed from a relational database, and then a factor analysis function is performed on the data to create a factor loadings matrix that has factors as columns and observed variables from the customer transaction data as rows, wherein each of the observed variables is assigned to one of the factors in the factor loadings matrix that has the maximum value for the row. New variables are derived by means of a factor-scoring method that combines the variables into the factors in the factor loadings table. Customer destination segments are identified from the relational database using the factors. Additional customer destination segments are identified by means of a clustering tool using the derived new variables.

36 Claims, 2 Drawing Sheets

OTHER PUBLICATIONS

"Data Mining with Optimized Two-Dimensional Association Rules", Fukuda et al, ACM Transactions on Database Systems, Vo 26, No. 2, Jun. 2001.*

"High Performance Computing with the Array Package for Java: A Case Study using Data Mining", Moreira et al, SC' 99, ACM 1-58113-091-8/99/0011, ACM 1999.*

"Quantifiable data mining using ratio rules", F. Korn et al, The VLDB Journal 2000, pp. 254-266, Feb. 2000.*

C. Aggarwal et al., "Fast Algorithms for Projected Clustering," In Proceedings of the ACM SIGMOD Int'l Conf on Management of Data, Philadephia, PA, 1999.

R. Agrawal et al., "Automatic Subspace Clustering of High . . . Applications," In Proceedings of ACM SIGMOD Int'l Conf on Management of Data, Seattle, WA, 1998.

G. Graefe et al., "On the Efficient Gathering . . . Databases," Microsoft, AAA1, 5 pages, 1998.

F. Murtagh, "A Survey of Recent Advances in Hierarchical Clustering Algorithms," The Computer Journal, 26(4):354-359, 1983.

R.T. Ng et al., "Efficient and Effective Clustering Methods . . . Minings," In Proc. of the VLDB Conf, Santiago, Chile, 1994.

T. Zhang et al., "BIRCH: An Efficient Data Clustering . . . Databases," Int'l Proc of the ACM SIGMOD Conference, Montreal, Canada, pp. 103-114, 1996.

A White Paper Prepared by MicroStrategy, Inc., "The Case for Relational OLAP," 20 pages, 1995.

* cited by examiner

FACTOR ANALYSIS/RETAIL DATA MINING SEGMENTATION IN A DATA MINING SYSTEM

CROSS REFERENCE TO RELATED APPLICATIONS

This application is related to the following co-pending and commonly assigned patent applications:

application Ser. No. 09/739,993, filed on 18 Dec. 2000, by Paul M. Cereghini and Scott W. Cunningham, and entitled "ARCHITECTURE FOR A DISTRIBUTED RELATIONAL DATA MINING SYSTEM,";

application Ser. No. 09/739,991, filed on 18 Dec. 2000, by Mikael Bisgaard-Bohr and Scott W. Cunningham, and entitled "ANALYSIS OF RETAIL TRANSACTIONS USING GAUSSIAN MIXTURE MODELS IN A DATA MINING SYSTEM,";

application Ser. No. 09/740,119, filed on 18 Dec. 2000, by Scott W. Cunningham, and entitled "GAUSSIAN MIXTURE MODELS IN A DATA MINING SYSTEM,"; and application Ser. No. 09/739,994, filed on 18 Dec. 2000, by Mikael Bisgaard-Bohr and Scott W. Cunningham, and entitled "DATA MODEL FOR ANALYSIS OF RETAIL TRANSACTIONS USING GAUSSIAN MIXTURE MODELS IN A DATA MINING SYSTEM,";

all of which applications are incorporated by reference herein.

BACKGROUND OF THE INVENTION

1. Field of the Invention

This invention relates to a computer-implemented data mining system, and in particular, to a system for analyzing customer transaction data using Factor Analysis/Retail Data Mining Segmentation in a distributed relational data mining system.

2. Description of Related Art

Many computer-implemented systems are used to analyze commercial and financial transaction data. In many instances, such data is analyzed to gain a better understanding of customer behavior by analysis of customer transactions.

Generally, customer transaction data is organized into "baskets" and is stored in two-dimensional data tables comprised of rows and columns, wherein each row comprises one or more transactions and each column is an attribute of the transactions, called observed variables, such as dollar value of each transaction, quantities bought in different departments, transaction time, mode of payment, etc. Companies often use one or more data analysis tools to mine such customer transaction data, in order to identify patterns in the customers' behavior.

Prior art tools for analyzing customer transaction data often involve one or more of the following techniques:

1. Ad hoc querying: This methodology involves the iterative analysis of transaction data by human effort, using querying languages such as SQL.

2. On-line Analytical Processing (OLAP): This methodology involves the application of automated software front-ends that automate the querying of relational databases storing transaction data and the production of reports therefrom.

3. Statistical packages: This methodology requires the sampling of transaction data, the extraction of the data into flat file or other proprietary formats, and the application of general purpose statistical or data mining software packages to the data.

Factor Analysis (FA) provides a technique that can uncover factors underlying customer purchasing behavior through a logically justifiable partitioning of the observed variables. Each factor represents an affinity group, i.e., a group of observed variables (e.g., products, departments, etc.), that account for a significant percentage (e.g. 80%) of a basket's dollar value.

The affinity groups provide data reduction or compression, as the dimensionality of the original customer transaction data is reduced through the substitution of the original numerous observed variables with a smaller set of factors that preserves most of the behavioral patterns present in the original customer transaction data. However, these factors are able to explain most of the customers' purchasing patterns and interrelationships between the original variables.

Each affinity group is used to define a customer destination segment, since most of a basket's dollar value has the affinity group as its destination. An analysis of a customer destination segment may reveal its strategic importance to the retailer. The analysis of the metrics of destination segments (traffic, quantities, dollar value, margins, etc.) may reveal that some of these destination segments generate a significant level of "traffic" that is substantially profitable.

Nonetheless, there remains a need for a computer automated system that would enable analyzing customer transaction data.

SUMMARY OF THE INVENTION

A computer-implemented data mining system that analyzes customer transaction data using Factor Analysis/Retail Data Mining Segmentation. Customer data is accessed from a relational database, and then a factor analysis function is performed on the data to create a factor loadings matrix that has factors as columns and observed variables from the customer transaction data as rows, wherein each of the observed variables is assigned to the factors in the factor loadings matrix that has the maximum value for the row. New variables are derived by means of a factor-scoring method that combines the variables into the factors in the factor loadings table. Customer destination segments are identified from the relational database using the factors, and by means of a clustering tool using the new variables.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Factor Analysis/Retail Data Mining Segmentation, as performed in the present invention, differs greatly from Factor Analysis, as performed in the prior art. The present invention automates the mapping of observed variables to factors, thus sparing analysts from the task of sifting through the data required to construct factor structures. In addition, the present invention provides a novel method for combining Factor Analysis with Clustering to derive new variables using factors in lieu of observed variables to identify additional customer destination segments.

Hardware and Software Environment

Figure 1:
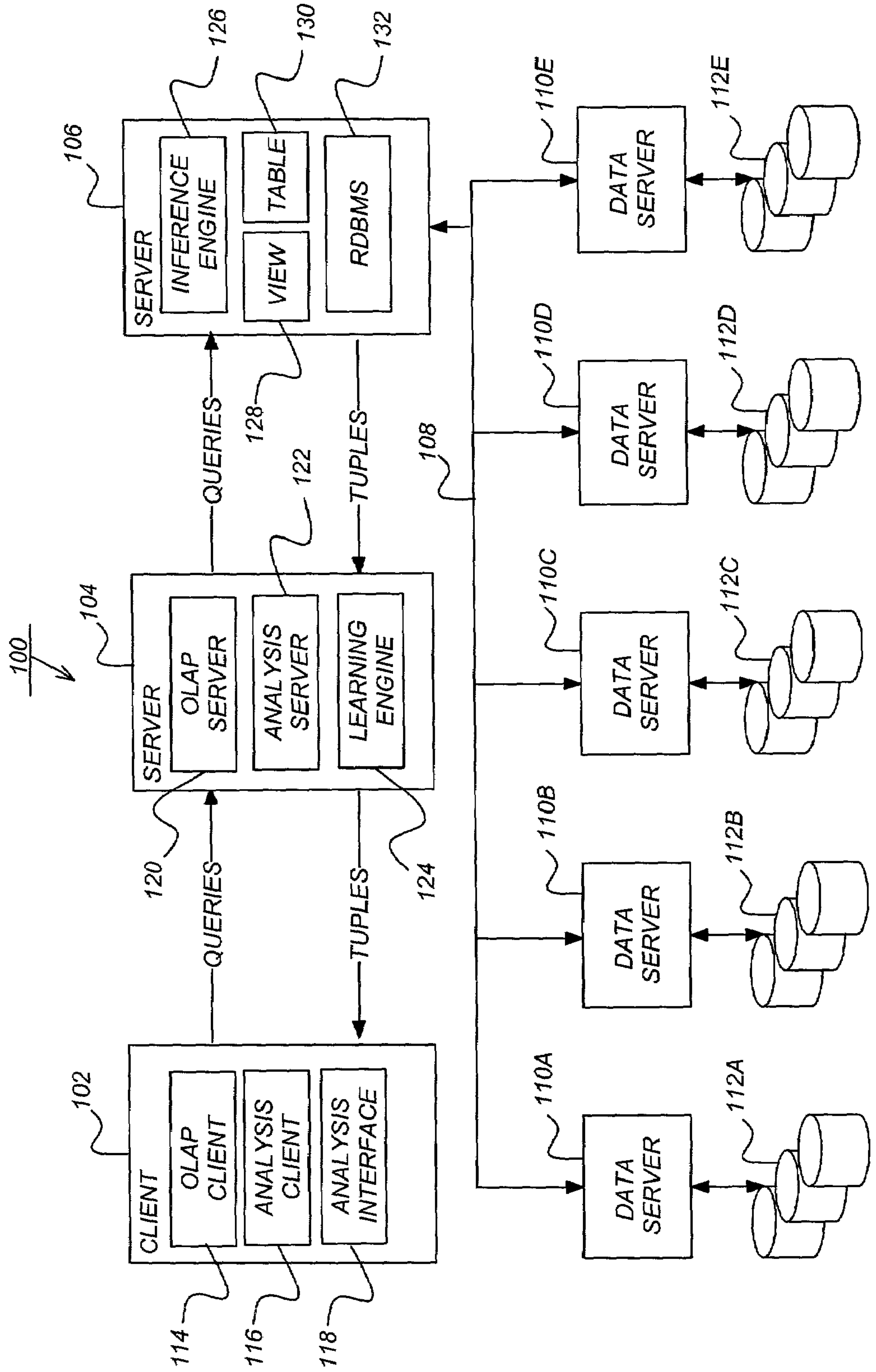
FIG. 1 illustrates an exemplary hardware and software environment that could be used with the present invention.

FIG. 1 illustrates an exemplary hardware and software environment that could be used with the present invention. In the exemplary environment, a computer system 100 implements a data mining system in a three-tier client-server architecture comprised of a first client tier 102, a second server tier 104, and a third server tier 106. In the preferred embodiment, the third server tier 106 is coupled via a network 108 to one or more data servers 110A–110E storing a relational database on one or more data storage devices 112A–112E.

The client tier 102 comprises an Interface Tier for supporting interaction with users, wherein the Interface Tier includes an On-Line Analytic Processing (OLAP) Client 114 that provides a user interface for generating SQL statements that retrieve data from a database, an Analysis Client 116 that displays results from a data mining procedure, and an Analysis Interface 118 for interfacing between the client tier 102 and server tier 104.

The server tier 104 comprises an Analysis Tier for performing one or more data mining procedure, wherein the Analysis Tier includes an OLAP Server 120 that schedules and prioritizes the SQL statements received from the OLAP Client 114, an Analysis Server 122 that schedules and invokes the data mining procedure to analyze the data retrieved from the database, and a Learning Engine 124 performs a Learning step of the data mining procedure. In the preferred embodiment, the data mining procedure comprises a Factor Analysis/Retail Data Mining Segmentation tool that maps observed variables from the relation database to factors, uncovers customer destination segments using the factors, and derives new variables. The data mining procedure also invokes a clustering tool, which is then used to identify additional customer destination segments using the derived new variables.

The server tier 106 comprises a Database Tier for storing and managing the databases, wherein the Database Tier includes an Inference Engine 126 that performs an Inference step of the data mining procedure, a relational database management system (RDBMS) 132 that performs the SQL statements against a Data Mining View 128 to retrieve the data from the database, and a Model Results Table 130 that stores the results of the data mining procedure.

The RDBMS 132 interfaces to the data servers 110A–110E as a mechanism for storing and accessing large relational databases. The preferred embodiment comprises the Teradata® RDBMS, sold by NCR Corporation, the assignee of the present invention, which excels at high volume forms of analysis, although other RDBMSs could be used as well. Moreover, the RDBMS 132 and the data servers 110A–110E may use any number of different parallelization mechanisms, such as hash partitioning, range partitioning, value partitioning, or other partitioning methods. In addition, the data servers 110 perform operations against the relational database in a parallel manner as well.

Generally, the data servers 110A–110E, OLAP Client 114, Analysis Client 116, Analysis Interface 118, OLAP Server 120, Analysis Server 122, Learning Engine 124, Inference Engine 126, Data Mining View 128, Model Results Table 130, and/or RDBMS 132 each comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

For example, the 3-tier architecture of the preferred embodiment could be implemented on 1, 2, 3 or more independent machines. The present invention is not restricted to the hardware environment shown in FIG. 1.

Operation of the Data Mining System

Factor Analysis/Retail Data Mining (FA/RDM) Segmentation is a process of analyzing customer transaction data for affinity groups and customer destination segments. Affinity groups indicate the frequency with which various products are purchased both together and separately. Customer destination segments reveal the different patterns that are possible from affinity groups.

Figure 2:
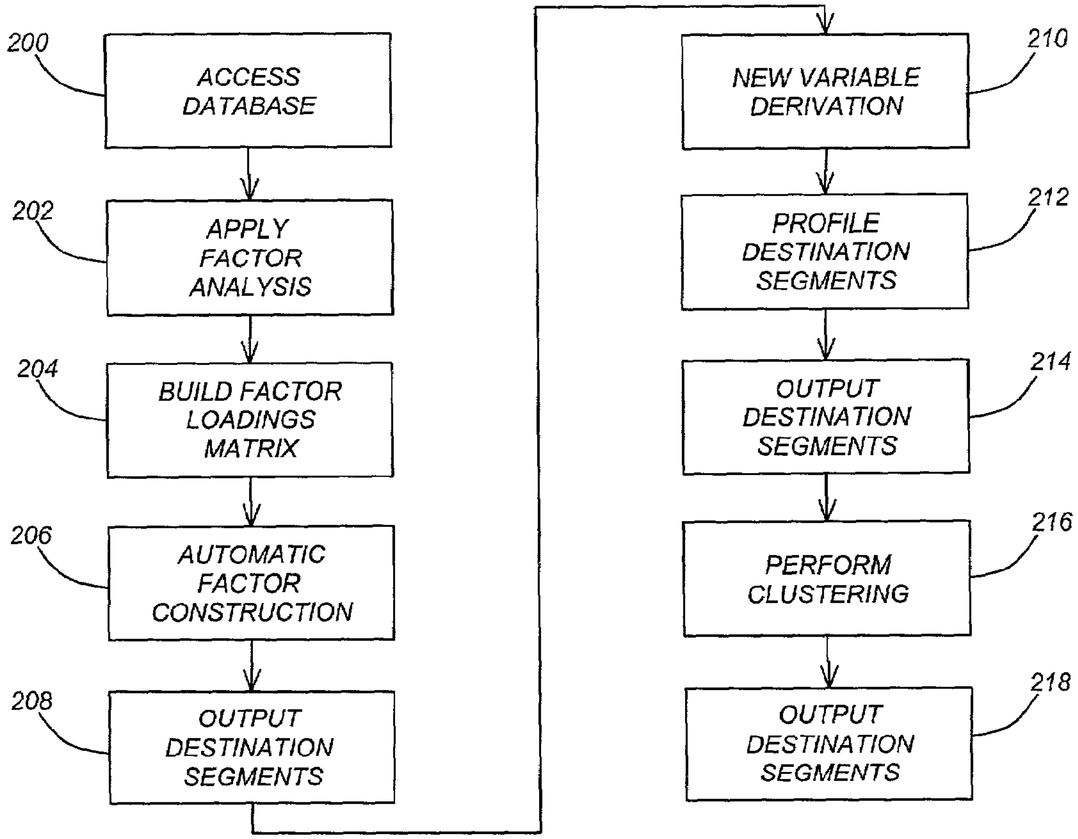
FIG. 2 is a flowchart that illustrates the operation of the preferred embodiment of the present invention.

FIG. 2 is a flowchart that illustrates the operation of the preferred embodiment of the present invention.

Block 200 represents customer transaction data being accessed from the relational database. Specifically, baskets and observed variables therein are identified and retrieved from the relational database.

Block 202 represents a Factor Analysis function being applied to the customer transaction data. For example, a covariance or a correlation matrix (sum of products of squared deviations around the mean) may be generated from the baskets and observed variables.

Block 204 represents a factor loadings matrix being built. The factor loadings matrix has factors as columns and observed variables as rows.

Block 206 represents automatic factor construction being performed, wherein the observed variables are automatically assigned or mapped to factors in the factor loadings matrix. Each observed variable is assigned to the factor that has the maximum value for the row. Consequently, each factor represents an affinity group of observed variables that account for a specified percentage (e.g. 80%) of a basket's total dollar value.

Block 208 represents the output of one or more customer destination segments represented by the affinity groups in the factor loadings matrix. In this step, each affinity group of observed variables is used to define a customer destination segment from the customer transaction data. Moreover, these customer destination segments may be separately stored in the relational database for future use.

Block 210 represents the derivation of new variables by means of a factor-scoring method that combines the variables into the identified factors. Two alternative embodiments are available: (1) use factor scores generated by a data reduction function, or (2) use factor scores generated by an unweighted sum of variables assigned to each factor. These factor scores can be used as the new variables, possibly along with other variables, in order to search for additional customer segments.

Block 212 represents the profiling of the customer destination segments. This entails selecting the subset of baskets related to a given factor using a contribution (of the factor to total basket value, e.g. 80%), and then generating a profile for the selected subset of baskets. This profile should include, for each segment (factor), at least the following metrics: average dollar sales, average quantity, average distinct articles, average distinct department, average cost, and average margin. The percentages of these metrics should also be included in the profile.

Block 214 represents the output of the customer destination segments. This output may include some or all of the information found in the profile. Moreover, these customer destination segments may be separately stored in the relational database for future use.

Block 216 represents a clustering function being performed to search for additional customer destination segments using the remaining unclassified baskets (baskets not assigned to the original customer destination segment in Block 208). This step uses only the first factor (the factor that explains most of the variability in the data) to derive a new variable, that is then used to perform the clustering function. This derived new variable is defined for each basket as the first factor's segment value defined above. The single variable clustering is found to result in robust and well-balanced segments, in terms of traffic, in addition to speeding up execution time for the clustering task.

Block 218 represents the output of the additional customer destination segments identified by the clustering function using the new derived variables. This output may include some or all of the information found in the profile. Moreover, these new customer destination segments may be separately stored in the relational database for future use.

Experimental Results

The procedure outlined above was applied to actual customer transaction data comprised of 110,860 baskets and 64 observed variables (i.e., sales values in 64 departments). The results from are reported in Table 1 and Table 2 below.

Table 1 shows the structure of the factors in terms of the observed variable (e.g. dept00, dept11, etc.), wherein this table shows how these variables are partitioned among the extracted factors. Table 2 lists, for each factor, representative labels for the affinity groups (e.g., Yuppie Consumer, etc.) and the observed variables (e.g. grocery, bakery, etc.). These results show that 24 interesting affinity grouping of departments were uncovered based on actual consumer purchase behavior. These factors can then be used to identify customer destination segments.

Some of the affinity groups are surprising, for example, Factor5 (vegetables and auto supplies) and Factor2 (stockings and office technology). These unusual affinity groups may potentially constitute key segments for cross-selling opportunities.

TABLE 1

| Factor Structure (Observed Variables) |
| --- |
| Factor1: (dept00, dept11, dept12, dept13, dept15, dept16, dept19, dept20, dept21, dept22, dept23, dept24, dept25, dept26, dept49, and dept51) |
| Factor2: (dept79, dept80, dept82, dept83, dept84, and dept87) |
| Factor3: (dept68, dept91) |
| Factor4: (dept50) |
| Factor5: (dept27, dept29, and dept62) |
| Factor6: (dept52) |
| Factor7: (dept73, dept81, and dept88) |
| Factor8: (dept37) |
| Factor9: (dept63, dept65, and dept66) |
| Factor10: (dept45, dept72, and dept74) |
| Factor11: (dept44) |
| Factor12: (dept86) |
| Factor13: (dept42, dept92) |
| Factor14: (dept40, dept41, dept69, and dept71) |
| Factor15: (dept28, dept30, and dept32) |
| Factor16: (dept76, dept78) |
| Factor17: (dept70, dept75) |
| Factor18: (dept77, dept89) |
| Factor19: (dept60) |
| Factor20: (dept61, dept64) |
| Factor21: (dept10) |
| Factor22: (dept43) |
| Factor23: (dept67) |
| Factor24: (dept90) |

TABLE 2

| Factor Structure (Business Labels) |
| --- |
| Factor1: Yuppie Consumer (grocery, bakery, beverage, prepared and convenience, canned, frozen, eggs, dairy, cheese, meat, charcuterie, poultry, fish, fruit, sport, cosmetic) |
| Factor2: IT Parent (men's clothes, shoes, stockings, dept 82, baby diapers, office technology) |
| Factor3: Handy Consumer (spare parts, building materials) |
| Factor4: Forever Clean (cleaning powder) |
| Factor5: Vegetarian Romantic Handy Motorist (vegetables, cut flowers, auto supplies) |
| Factor6: Nose Warrior (tissue paper) |
| Factor7: Indoors/Outdoors Parent (leather goods, lingerie, and children's clothes) |
| Factor8: Kitchen Lover (central kitchen) |
| Factor9: Home Designer (gardening supplies, flowers/plants, paintings handicrafts) |
| Factor10: Good-Life Lover (games, toys & books, toiletries,) |
| Factor11: Happy Workshop Maker (living shop accessories) |
| Factor12: Bed & Bath Maker (linen) |
| Factor13: Enlightened Service Seeker (lighting, service) |
| Factor14: Handy Home Owner (bookshelves, floor covering, garage, household & Kitchen) |
| Factor15: Carnivorous Planter (flowers accessories, plants, meat) |
| Factor16: Time Watcher (clocks & watches, photo & film) |
| Factor17: Household Outdoorsman (household & kitchen, sports & camping) |
| Factor18: Hi-Fi Parent (entertainment electronics hi-fi, infant clothes) |
| Factor19: Heavy Metals Addict (iron wares tools) |
| Factor20: Electro-Mechanic (machine/devices electronic) |
| Factor21: Grocery Lover (groceries) |
| Factor22: Happy Home-Decorator (living accessories decor) |
| Factor23: Home Fixer-upper (building materials) |
| Factor24: Stockout Hedger (spare parts) |

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a computer-implemented data mining system that analyzes customer transaction data using Factor Analysis/Retail Data Mining Segmentation. The data is accessed from a relational database, and then a factor analysis function is performed on the data to create a factor loadings matrix that has factors as columns and observed variables from the customer transaction data as rows, wherein each of the observed variables is assigned to one of the factors in the factor loadings matrix that has the maximum value for the row. New variables are derived by means of a factor-scoring method that combines the variables into the factors in the factor loadings table. Customer destination segments are identified from the relational database using the derived factors. Additional customer destination segments are uncovered by means of a clustering tool using the derived new variables.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for analyzing data in a computer-implemented data mining system, comprising:

(a) accessing customer transaction data from a relational database in the computer-implemented data-mining system;

(b) performing a factor analysis function on the customer transaction data in the computer-implemented data mining system to create a factor loadings matrix that has factors as columns and observed variables from the customer transaction data as rows, wherein each of the observed variables is assigned to one of the factors in the factor loadings matrix that has a maximum value for the row;

(c) deriving new variables in the computer-implemented data mining system by means of a factor-scoring method that combines the new variables into the factors in the factor loadings matrix; and (d) identifying customer destination segments from the relational database in the computer-implemented data mining system using the factors and the new variables;

(e) using the identified customer destination segments for analyzing data in the computer implemented data mining system.

2. The method of claim 1, wherein the customer transaction data is comprised of baskets.

3. The method of claim 2, wherein each of the factors in the factor loadings matrix represents an affinity group of the observed variables that account for a specified percentage of a baskets total dollar value.

4. The method of claim 3, wherein each of the affinity groups is used to define one or more customer destination segments from the customer transaction data.

5. The method of claim 1, wherein the factor-scoring method uses scores generated by a data reduction function.

6. The method of claim 1, wherein the factor-scoring method uses an unweighted sum of variables assigned to each factor.

7. The method of claim 1, wherein the factor-scoring method generates factor scores as the new variables.

8. The method of claim 1, wherein the identifying step comprises selecting a subset of baskets related to each of the factors.

9. The method of claim 8, further comprising generating a profile for the selected subset of baskets.

10. The method of claim 1, further comprising performing a clustering function using the new variables to search for the customer destination segments.

11. The method of claim 10, wherein the clustering function uses only a first one of the factors to derive the new variables for use by the clustering function.

12. The method of claim 1, further comprising identifying customer destination segments from the relational database in the computer-implemented data mining system by means of a clustering tool using the new variables.

13. A computer-implemented data mining system for analyzing data, comprising:

(a) a computer;

(b) logic, performed by the computer, for:

(1) accessing customer transaction data from a relational database in the computer-implemented data mining system;

(2) performing a factor analysis function on the customer transaction data in the computer-implemented data mining system to create a factor loadings matrix that has factors as columns and observed variables from the customer transaction data as rows, wherein each of the observed variables is assigned to one of the factors in the factor loadings matrix that has a maximum value for the row;

(3) deriving new variables in the computer-implemented data mining system by means of a factor-scoring method that combines the new variables into the factors in the factor loadings matrix; and (4) identifying customer destination segments from the relational database in the computer-implemented data mining system using the factors and the new variables;

(5) using the identified customer destination segments for analyzing data in the computer implemented data mining system.

14. The system of claim 13, wherein the customer transaction data is comprised of baskets.

15. The system of claim 14, wherein each of the factors in the factor loadings matrix represents an affinity group of the observed variables that account for a specified percentage of a baskets total dollar value.

16. The system of claim 15, wherein each of the affinity groups is used to define one or more customer destination segments from the customer transaction data.

17. The system of claim 13, wherein the factor-scoring method uses scores generated by a data reduction function.

18. The system of claim 13, wherein the factor-scoring method uses an unweighted sum of variables assigned to each factor.

19. The system of claim 13, wherein the factor-scoring method generates factor scores as the new variables.

20. The system of claim 13, wherein the logic for identifying comprises logic for selecting a subset of baskets related to each of the factors.

21. The system of claim 20, further comprising logic for generating a profile for the selected subset of baskets.

22. The system of claim 13, further comprising logic for performing a clustering function using the new variables to search for the customer destination segments.

23. The system of claim 22, wherein the clustering function uses only a first one of the factors to derive the new variables for use by the clustering function.

24. The system of claim 23, further comprising logic for identifying customer destination segments from the relational database in the computer-implemented data mining system by means of a clustering tool using the new variables.

25. An article of manufacture tangibly embodied on a computer readable medium embodying logic for analyzing data in a computer-implemented data mining system, the logic comprising:

(a) accessing customer transaction data from a relational database in the computer-implemented data mining system;

(b) performing a factor analysis function on the customer transaction data in the computer-implemented data mining system to create a factor loadings matrix that has factors as columns and observed variables from the customer transaction data as rows, wherein each of the observed variables is assigned to one of the factors in the factor loadings matrix that has a maximum value for the row;

(c) deriving new variables in the computer-implemented data mining system by means of a factor-scoring method that combines the new variables into the factors in the factor loadings matrix; and (d) identifying customer destination segments from the relational database in the computer-implemented data mining system using the factors and the new variables;

(e) using the identified customer destination segments for analyzing data in the computer implemented data mining system.

26. The article of manufacture of claim 25, wherein the customer transaction data is comprised of baskets.

27. The article of manufacture of claim 26, wherein each of the factors in the factor loadings mat represents an affinity group of the observed variables that account for a specified percentage of a basket's total dollar value.

28. The article of manufacture of claim 27, wherein each of the affinity groups is used to define one ox mote customer destination segments from the customer transaction data.

29. The article of manufacture of claim 25, wherein the factor-scoring method uses scores generated by a data reduction fraction.

30. The article of manufacture of claim 25, wherein the factor-scoring method uses an unweighted sum of variables assigned to each factor.

31. The article of manufacture of claim 25, wherein the factor-scoring method generates factor scores as the new variables.

32. The article of manufacture of claim 25, wherein the logic for identifying comprises logic for selecting a subset of baskets related to each of the factors.

33. The article of manufacture of claim 32, further comprising generating a profile for the selected subset of baskets.

34. The article of manufacture of claim 25, further comprising performing a clustering function using the new variables to search for the customer destination segments.

35. The article of manufacture of claim 34, wherein the clustering function uses only a first one of the factors to derive the new variables for use by the clustering function.

36. The article of manufacture of claim 35, further comprising identifying customer destination segments from the relational database in the computer-implemented data mining system by means of a clustering tool using the new variables.

* * * * *

UNITED STATES PATENT AND TRADEMARK OFFICE

CERTIFICATE OF CORRECTION

PATENT NO. : 7,069,197 B1
APPLICATION NO. : 09/999522
DATED : June 27, 2006
INVENTOR(S) : H. Saidane It is certified that error appears in the above-identified patent and that said Letters Patent is hereby corrected as shown below:

Column 8, Line 12, Claim 12, after “claim” delete “1” and insert --11--
Column 10, Line 2, Claim 27, after “loadings” delete “mat” and insert --matrix--
Column 10, Line 6, Claim 28, after “one” delete “or mote” and insert --or more--

Signed and Sealed this

Thirty-first Day of July, 2007

JON W. DUDAS
*Director of the United States Patent and Trademark Office*